US010096207B2

(12) United States Patent
Williams et al.

(10) Patent No.: US 10,096,207 B2
(45) **Date of Patent: *Oct. 9, 2018**

(54) KIOSK FOR GAMING

(71) Applicant: CFPH, LLC, New York, NY (US)

(72) Inventors: Paul Williams, Las Vegas, NV (US); Matthew Morrissette, Las Vegas, NV (US)

(73) Assignee: CFPH, LLC, New York, NY (US)

( * ) Notice: Subject to any disclaimer, the term of this patent is extended or adjusted under 35 U.S.C. 154(b) by 54 days.

This patent is subject to a terminal disclaimer.

(21) Appl. No.: 14/995,979

(22) Filed: Jan. 14, 2016

(65) Prior Publication Data

US 2016/0133092 A1 May 12, 2016

Related U.S. Application Data

(63) Continuation of application No. 13/837,224, filed on Mar. 15, 2013, now Pat. No. 9,240,098.

(51) Int. Cl.

*A63F 13/00* (2014.01)
*G07F 17/32* (2006.01)

(52) U.S. Cl.

CPC ...... *G07F 17/3244* (2013.01); *G07F 17/3206* (2013.01); *G07F 17/3209* (2013.01); *G07F 17/3237* (2013.01); *G07F 17/3241* (2013.01)

(58) Field of Classification Search

None

See application file for complete search history.

(56) References Cited

U.S. PATENT DOCUMENTS

| | | | | |
|---|---|---|---|---|
| 6,709,333 | B1 * | 3/2004 | Bradford | G07F 17/32 463/29 |
| 7,980,948 | B2 * | 7/2011 | Rowe | G07F 17/32 463/20 |

(Continued)

FOREIGN PATENT DOCUMENTS

| | | |
|---|---|---|
| AU | 2014249291 | 10/2015 |
| CA | 2905733 | 10/2014 |

(Continued)

OTHER PUBLICATIONS

PCT Int'l Search Report for App. No. PCT/US2014/022632; dated Jul. 1, 2014; 4 pages.

(Continued)

*Primary Examiner* — Sunit Pandya

(74) *Attorney, Agent, or Firm* — Mark Miller

(57) ABSTRACT

A kiosk for gaming by patrons. An identification scanner may scan an identification document into digital form. A biological sensor such as a camera may obtain biological data describing a human patron. Input-output device(s) mounted in the kiosk may present information and accept registration/login information and gaming commands from a human patron. A currency acceptor and dispenser may accept money. The kiosk may ask a patron to insert an identification document into the identification scanner, and scan the document. The kiosk may obtain biological data describing the patron. The kiosk may verify the identity of the patron and acceptability of the patron for gaming based at least in part on the digital form of the patron's identification and the biological data. The kiosk may accept currency for deposit into a wagering account. Once the patron is verified and the account is funded, the kiosk may offer gaming activities to the verified patron out of the wagering account, and pay out gaming winnings at the currency dispenser.

24 Claims, 4 Drawing Sheets

(56) References Cited

U.S. PATENT DOCUMENTS

| | | | | |
|---|---|---|---|---|
| 9,240,098 | B2 | 1/2016 | Williams et al. | |
| 9,269,224 | B2 | 2/2016 | Williams et al. | |
| 9,744,444 | B2 | 8/2017 | Flaherty | |
| 2002/0091646 | A1 | 7/2002 | Lake | |
| 2003/0092489 | A1 | 5/2003 | Veradej | |
| 2003/0228898 | A1* | 12/2003 | Rowe | G07C 9/00158 463/25 |
| 2004/0038733 | A1* | 2/2004 | Walker | G06Q 30/0209 463/25 |
| 2004/0039655 | A1 | 2/2004 | Chau | |
| 2004/0147309 | A1* | 7/2004 | Chamberlain | G06Q 20/10 463/25 |
| 2005/0026670 | A1 | 2/2005 | Lardie | |
| 2005/0054417 | A1* | 3/2005 | Parrott | G07F 17/32 463/16 |
| 2005/0086168 | A1 | 4/2005 | Alvarez | |
| 2006/0281543 | A1* | 12/2006 | Sutton | G07F 17/32 463/29 |
| 2008/0071674 | A1 | 3/2008 | Thackston | |
| 2008/0188308 | A1 | 8/2008 | Shepherd et al. | |
| 2008/0214261 | A1 | 9/2008 | Alderucci | |
| 2008/0268934 | A1* | 10/2008 | Mattice | G07F 17/32 463/16 |
| 2009/0124376 | A1 | 5/2009 | Kelly et al. | |
| 2009/0276341 | A1 | 11/2009 | McMahan et al. | |
| 2010/0275267 | A1 | 10/2010 | Walker et al. | |
| 2011/0014975 | A1* | 1/2011 | Grabiec | G07F 17/34 463/25 |
| 2012/0021832 | A1 | 1/2012 | Lyons | |
| 2014/0256425 | A1 | 9/2014 | Flaherty | |
| 2014/0370959 | A1 | 12/2014 | Yacenda | |
| 2016/0351010 | A1 | 12/2016 | Williams et al. | |
| 2017/0326455 | A1 | 11/2017 | Flaherty | |
| 2017/0340973 | A1 | 11/2017 | Flaherty | |

FOREIGN PATENT DOCUMENTS

| | | |
|---|---|---|
| JP | 2000342857 | 12/2000 |
| JP | 2008-253743 | 2/2008 |
| JP | 2008-546443 | 12/2008 |
| JP | 2010-509031 | 3/2010 |
| MO | I/001265 | 3/2014 |
| TW | 201508662 | 3/2015 |
| WO | WO 2004/095384 | 11/2004 |
| WO | WO 2006/138064 | 12/2006 |
| WO | WO 2008/061138 | 5/2008 |
| WO | WO 2014/164504 | 10/2014 |

OTHER PUBLICATIONS

PCT Written Opinion of the International Searching Authority for App. No. PCT/US2014/022632; dated Jul. 1, 2014; 14 pages.
U.S. Office Action for U.S. Appl. No. 13/837,224; dated Jul. 2, 2014; 9 pages.
Extended EP Search Report for EP Application No. 14779876.3 dated Oct. 14, 2016; 8 pages.
AU First Examination Report for Application No. 2014249291 dated May 16, 2017; 3 pages.
CN Office Action for Application No. 201480026794.7 dated May 25, 2017; 18 pages (w/ English Translations).
Communication Pursuant to Article 94(3) EPC for EP Application No. 14779876.3 dated Dec. 6, 2017; 9 pages.
JP Office Action for Application No. 2016-501021; dated Feb. 13, 2018; (7 pages w/English Translations).
CN Office Action for Application No. 201480026794.7 dated Feb. 5, 2018; 18 pages(w/English Translations).
AU Notice of Acceptance for Application No. 201424929; dated Mar. 29, 2018; 3 pages.
Complaint for Patent Infringement, Case No. 1;18-cv-00533-UNA, filed Apr. 10, 2018.

* cited by examiner

Welcome !

Please wait - reviewing your information.

The sign up process is complete and we are reviewing your information.

An email will be sent to you to complete your confirmation.

KIOSK FOR GAMING

CROSS REFERENCE TO RELATED APPLICATIONS

This application is a continuation of U.S. patent application Ser. No. 13/837,224, filed Mar. 15, 2013, which is hereby incorporated by reference in its entirety herein.

BACKGROUND

This application relates to network-type amusement devices including means for processing electronic data (e.g., including computer/video game, etc.)

SUMMARY

In general, in a first aspect, the invention features a kiosk for gaming by patrons. The kiosk has a housing designed hold a processor, identification scanner, and biological sensor, and to permit installation at a site for interaction with human patrons. The identification scanner mounted in the kiosk housing is designed to accept an identification document and to scan identification information from the identification document into digital form for transmission over a network. A biological sensor mounted in the kiosk housing is oriented to obtain biological data describing a human patron at the kiosk into digital form for transmission over a communication network. An input-output device(s) mounted in the kiosk housing is designed to accept registration/login information and gaming commands from a human patron and to present information to the human patron for interactive gaming. One or more microprocessors mounted in the kiosk housing are programmed to: present instructions to the human patron through the input-output device(s), including an instruction to the patron to insert an identification document into the identification scanner; obtain a digital form of the patron's identification from the identification scanner; obtain biological data describing a biological feature of the patron from the biological sensor; verify the identity of the patron and acceptability of the patron for gaming based at least in part on the digital form of the patron's identification and the biological data; and on verification, to offer gaming activities to the verified patron.

In general, in a second aspect, the invention features a kiosk for gaming by patrons. A kiosk housing holds a processor, input/output devices, currency acceptor and dispenser, to protect them against intrusion, and to permit installation at a site for interaction with human patrons. Input-output device(s) accept registration/login information and gaming commands from a human patron and to present information to the human patron for interactive gaming. A currency acceptor and dispenser mounted in the kiosk housing accepts currency and dispense currency for gaming. One or more microprocessors are programmed to: present instructions to the human patron through the input-output device(s), including an instruction to the patron to register and verify the patron's identity; accept currency at the currency acceptor for deposit into a wagering account held in an off-site computer; on verification and acceptance of currency, offer gaming activities to the verified patron out of the wagering account; and pay out gaming winnings from the wagering account at the currency dispenser.

Embodiments of the invention may include one or more of the following features. The biological sensor may be a camera and the biological data may be a digital image of a face of the patron captured by the camera. The biological sensor may be a signature pad and the biological data may be a digital representation of the patron's signature. The patron identity may be verified based at least in part on face recognition and comparison of the digital image against a reference photograph. The identity of the patron may be verified based at least in part on a verification received from an off-site verification office in response to the digital image of the patron's face and at least part of the digital identification data. The identity of the patron may be verified based at least in part on transmitting the biological data to an off-site verification office. The identity of the patron may be verified based at least in part on processing by a microprocessor in the kiosk. The identity of the patron may be verified based at least in part on analysis of the biological data against a reference in a microprocessor mounted in the kiosk. The identification scanner may be designed to accept and scan a government-issued drivers license or identification card. The identity of the patron may be verified based at least in part on information regarding a financial account of the patron.

The above advantages and features are of representative embodiments only, and are presented only to assist in understanding the invention. It should be understood that they are not to be considered limitations on the invention as defined by the claims. Additional features and advantages of embodiments of the invention will become apparent in the following description, from the drawings, and from the claims.

DESCRIPTION

I. Structure

Figure 1:
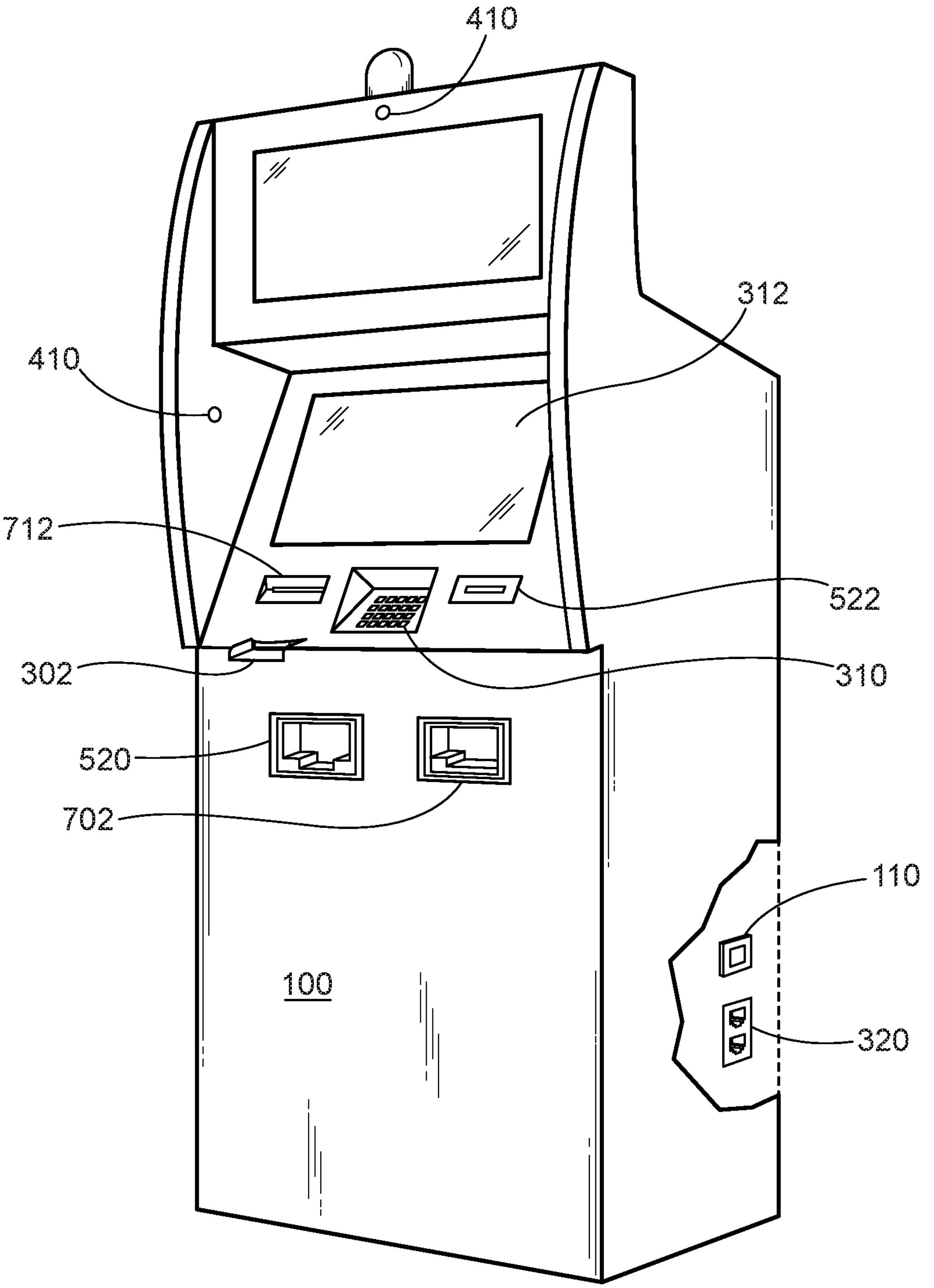
FIG. 1 is a perspective drawing of a gaming kiosk.

Referring to FIG. 1, kiosk 100 for gaming applications may have components that permit verification and registration of a patron, adding money into an electronic wallet, paying out winnings, and entering commands to play various games. Kiosk 100 may have one or more microprocessors 110, ID card acceptor 302, keypad 310, one or more display screens 312, one or more cameras 410, one or more network connectors 420, credit/ATM card acceptor 522, currency and/or coin validator/acceptor 520, currency and/or coin dispenser 702, printer 712, and nonvolatile storage.

Kiosk 100 may have one or more connectors 420 to various networks. For security reasons, in most cases these connectors 420 should have static IP addresses. In some cases kiosk 100 may have dual connectors 420, one connector 420 to the public internet, and a second connector 420 to a financial transaction network, such as the ATM network, the FIX, FAST, or SWIFT networks, etc.

Kiosk 100 may have multiple microprocessors 110. For example, one microprocessor may perform all management and interconnection of the various devices, while games and other user-level software may execute on a second processor. This provides some isolation against intrusion.

Screen 312 may be a touch-sensitive display.

Kiosk 100 may have additional input/output devices for gaming, such as joysticks, touchpads, trackballs, pushbuttons, a slot machine arm, loudspeakers, etc.

Currency acceptors/dispensers/cassettes 520, 702 suitable for use are available from Fujitsu.

Kiosk 100 may have an uninterruptible power supply.

A light atop kiosk 100 may be used to illuminate the patron for photography, and/or may alert staff when there is a large payout at kiosk 100.

II. Patron Verification, Registration, and Login

Figure 2:
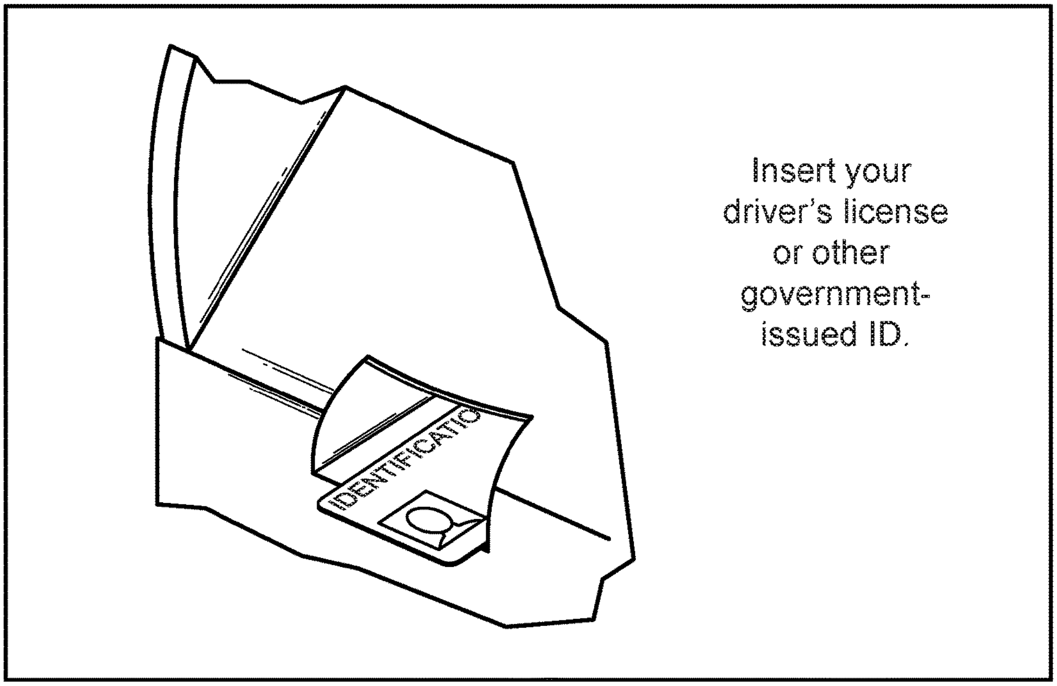
FIG. 2 is a screen shot.

Referring to FIG. 2, kiosk 100 may invite patrons to play by displaying a screen that asks patrons to insert a casino patron card, a driver's license, or other government issued ID into ID acceptor 302.

Figure 3:
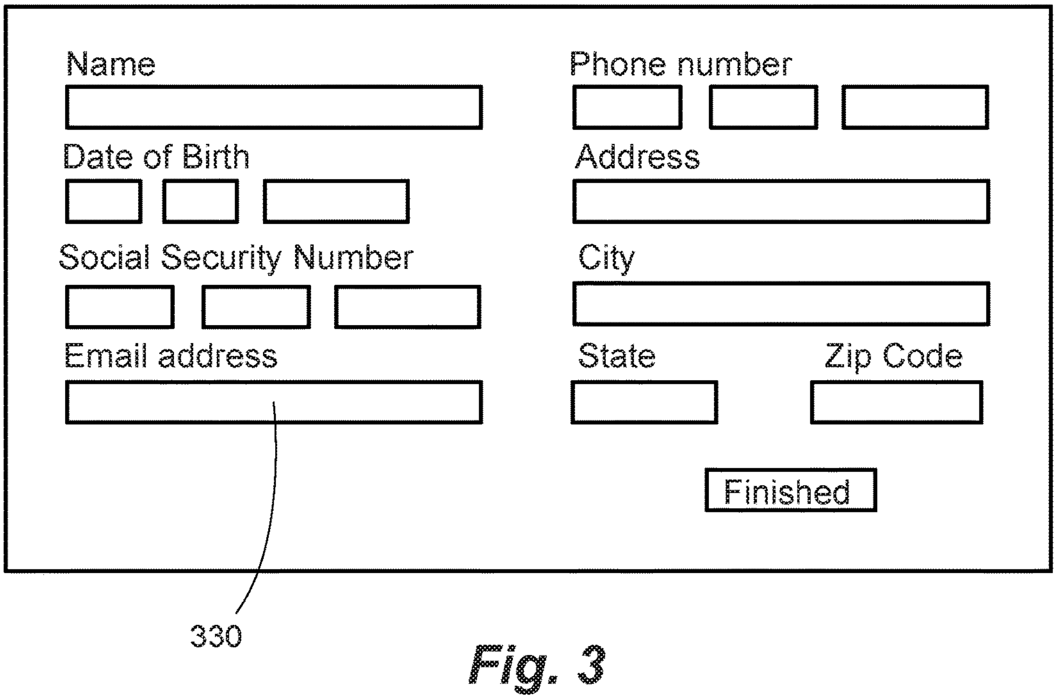
FIG. 3 is a screen shot.

Referring to FIG. 3, when the patron inserts an ID into ID acceptor 302, microprocessor may instruct ID acceptor 302 to scan the ID card, and populate a registration information template 304 for display to the patron on screen 312. The patron may fill in whatever fields are not ascertainable from the ID card that was inserted, using keypad 310 or softkeys displayed on screen 312.

Figures 4, 5:
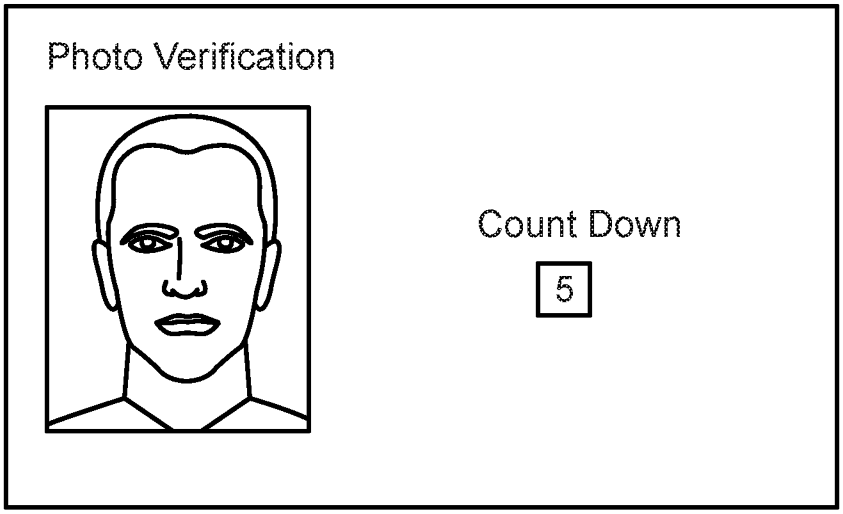
FIG. 4 is a screen shot.
FIG. 5 is a screen shot.

Referring to FIG. 4, kiosk 100 may then display an invitation to the patron to stand in front of camera 410 so that a photograph of the patron's actual face can be captured by camera 410. Kiosk 100 may display the current picture from camera 410 and ask the patron to pose, and give a countdown until the picture will be taken. Once the picture is taken by camera 410, the image may be stored in digital form.

In some cases, kiosk 100 may request a credit card at credit/ATM card acceptor 522 to gather additional information for verification. Credit card acceptor 522 may be programmed to gather a digital image of a signature from the card to use in verification.

In some cases, kiosk 100 may request entry of a bank transfer number and account number, a wagering account number, or a Paypal account number and password, to gather verification information.

In some cases, kiosk 100 may have a signature pad to gather a signature from the patron. In some cases, kiosk 100 may have a thumb scan or device to gather fingerprint data from the patron. In some cases, kiosk 100 may have an iris scan sensor to gather an iris scan from the patron.

In some cases, the gaming system may send an email to an email address 330 or an SMS text to a phone number designated by the patron to obtain further verification.

Kiosk 100 may ascertain a tax status for the patron—the patron's tax domicile, whether the patron has existing tax withholding paperwork registered with an entity that operates the gaming activities at kiosk 100, etc. Kiosk 100 may gather any information remaining needed to generate any W2G, 1099, 1042-S, or similar tax reporting to the federal government, state government, or other tax jurisdiction.

After all patron identification/verification information is received, kiosk 100 may verify the identity of the patron, and his/her suitability/acceptability for gaming activity.

In some cases, verification may involve a remote computer and/or remote human. Patron ID information, digital image from camera 410, a digital image of the signature, and/or other verification information may be forwarded over one of network links 420 to a supervisory office. Verification may be performed by computer. In other cases, a human at the supervisory office may review the information, photographs, and/or signature. The human at the supervisory office may compare the live photograph from camera 410 against the photo scanned from the ID card photographs to verify the patron's identity. The human may verify that the patron is eligible for use of the gaming system, and that the patron has a valid account on the gaming system.

In some cases, kiosk 100 may use verification software hosted on local microprocessor 110 to analyze and verify identity and suitability of the patron. For example, facial recognition software, signature verification software, and/or other identity verification techniques may be used.

Referring to FIG. 5, once verification is complete and approved, the supervisory office may either send a message to kiosk 100 for display to the patron, or may send an email to the patron's email address, explaining either that the patron is verified, or that verification has failed, as the case may be.

Once the patron is verified, the patron may establish a patron wagering account. Kiosk 100 may request any additional information not already received that is necessary to establish the account. In addition, this may be a convenient time to gather any information required for tax withholding and reporting. The patron may fund the wagering account by inserting cash, check, a credit or ATM card, or a casino slot machine value ticket into appropriate acceptor devices of kiosk 100. For example, an "add deposit" button on the kiosk's home page may lead to a series of screens where kiosk 100 asks the patron how much money is to be deposited, and in what form, and then leads the patron to insert cash into bill acceptor 520, or a credit card or ATM card into credit card acceptor 522, or the like, to fund the patron's wagering account.

Figure 6:
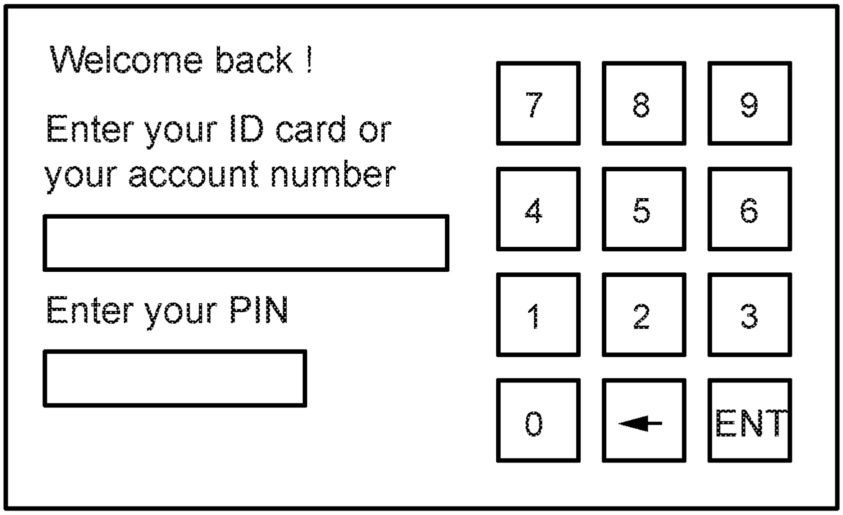
FIG. 6 is a screen shot.

Referring to FIG. 6, when the patron returns in the future, the patron may be able to use a shorter-form sign-in, by entering an account number and PIN, or a card and a PIN, or the like. This login may fail if the account is expired or locked out, if the PIN is incorrectly entered, if the backing bank account cannot be accessed, if the patron verification from FIG. 5 is not yet complete or was refused, if the patron's email address or telephone number cannot be verified, etc.

III. Gaming Play

The patron may then use screen 312 and keypad 310 to play various games offered on kiosk 100. The games may be hosted on microprocessor 110 on kiosk 100, or kiosk 100 may operate as a terminal/browser client for games hosted on a remote server. Gaming tasks may be divided among various computers in various ways, for example, betting lines may come from one remote computer, the betting book may be handled on another, and kiosk 100 may manage other parts of the gaming activity.

As play progresses, the patron may request transfers of funds to or from an account maintained by the gaming establishment for gaming at kiosk 100 and the patron's bank, credit, or other accounts.

Kiosk 100 may collect data at each taxable event (for example, a win of a bet, especially a win that takes the player's winnings for a day above a threshold for W2G, 1099, or 1042-S reporting). If tax withholding information was not gathered during the verification/registration phase, kiosk 100 may ask the patron for that information at any time that the patron becomes subject to withholding or reporting requirements.

At the end of play, the patron may request that that any portion of the balance remaining in the patron's wagering account be paid out to him or her. Payout may be paid through currency/coin dispenser 702, or may be refunded to one of the patron's bank accounts or credit card accounts. The request for payout may be offered from the kiosk's home page, and kiosk 100 may then lead the patron through a series of screens that ask the patron what portion of the current balance of the wagering account is to be paid out, and in what form. Kiosk 100 may send a receipt or report to the patron's email address.

IV. Other Features

Kiosk 100 may be programmed to function as an ordinary ATM, once a person inserts a traditional ATM card into card acceptor 522. Similar, kiosk may be programmed to accept large bills and provide small bills, simply to make change for patrons.

Printer 712 may be used to print various receipts of registration, deposit, or withdrawal. Printer 712 may also be used to print bar coded tickets with negotiable value. Receipts may be sent to the patron's email account or by SMS to the patron's telephone.

Nonvolatile storage may be used to journal patron-visible transactions, machine errors, and patron-invisible machine state transitions. Events journaled may include various errors, deposits, payouts, and the like. The journal may be printed on printer 712, emailed to the managing operator's office, or the like.

Microprocessor 110 of kiosk 100 may support a number of management/maintenance operations, such as inquiries of cash inventor, cash taken in or paid out, bill rejections, and the like.

V. Computer Implementation

Various processes described herein may be implemented by appropriately programmed general purpose computers, special purpose computers and computing devices. Typically a processor (e.g., one or more microprocessors 110, one or more microcontrollers, one or more digital signal processors) will receive instructions (e.g., from a memory or like device), and execute those instructions, thereby performing one or more processes defined by those instructions. Instructions may be embodied in one or more computer programs, or one or more scripts. The processing may be performed on one or more microprocessors, central processing units (CPUs), computing devices, microcontrollers, digital signal processors, or like devices or any combination thereof. Programs that implement the processing, and the data operated on, may be stored and transmitted using a variety of media. In some cases, hard-wired circuitry or custom hardware may be used in place of, or in combination with, some or all of the software instructions that can implement the processes. Algorithms other than those described may be used.

In some cases, kiosk 100 may be a "thin client," with almost all processing performed at a central server. In other cases, kiosk 100 may be software-heavy, hosting most of the management operations, device operations, gaming play, etc. Kiosk 100 may have one or multiple microprocessors 110. A server computer or centralized authority may or may not be necessary or desirable. In various cases, the network may or may not include a central authority device. Various processing functions may be performed on a central authority server, one of several distributed servers, or other distributed devices. Tasks and computation may be divided as convenient.

Programs and data may be stored in various media appropriate to the purpose, or a combination of heterogeneous media that may be read and/or written by a computer, a processor or a like device. The media may include nonvolatile media, volatile media, optical or magnetic media, dynamic random access memory (DRAM), static ram, a floppy disk, a flexible disk, hard disk, magnetic tape, any other magnetic medium, a CD-ROM, DVD, any other optical medium, punch cards, paper tape, any other physical medium with patterns of holes, electromagnetic domains or spots, a RAM, a PROM, an EPROM, a FLASH-EEPROM, any other memory chip or cartridge or other memory technologies. Transmission media include coaxial cables, copper wire and fiber optics, including the wires that comprise a system bus coupled to the processor.

Databases may be implemented using database management systems or ad hoc memory organization schemes. Alternative database structures to those described may be readily employed. Databases may be stored locally or remotely from a device which accesses data in such a database.

Processing may be performed in a network environment including a computer that is in communication (e.g., via a communications network) with one or more devices. The computer may communicate with the devices directly or indirectly, via any wired or wireless medium (e.g. the Internet, LAN, WAN or Ethernet, Token Ring, a telephone line, a cable line, a radio channel, an optical communications line, commercial on-line service providers, bulletin board systems, a satellite communications link, a combination of any of the above). Each of the devices may themselves comprise computers or other computing devices, such as those based on the Intel® Pentium® or Centrino™ processor, that are adapted to communicate with the computer. Any number and type of devices may be in communication with the computer.

For the convenience of the reader, the above description has focused on a representative sample of all possible embodiments, a sample that teaches the principles of the invention and conveys the best mode contemplated for carrying it out. Throughout this application and its associated file history, when the term "invention" is used, it refers to the entire collection of ideas and principles described; in contrast, the formal definition of the exclusive protected property right is set forth in the claims, which exclusively control. The description has not attempted to exhaustively enumerate all possible variations. Other undescribed variations or modifications may be possible. Where multiple alternative embodiments are described, in many cases it will be possible to combine elements of different embodiments, or to combine elements of the embodiments described here with other modifications or variations that are not expressly described. A list of items does not imply that any or all of the items are mutually exclusive, nor that any or all of the items are comprehensive of any category, unless expressly specified otherwise. In many cases, one feature or group of features may be used separately from the entire apparatus or methods described. Many of those undescribed variations, modifications and variations are within the literal scope of the following claims, and others are equivalent.

What is claimed is:

1. A kiosk, comprising:

a kiosk housing comprising:

a display screen;

an identification scanner configured to accept a government issue identification document and to scan identification information from the government issue identification document into digital form;

a communications interface for communicating over a communications network;

at least one processor;

memory storing instructions that, when executed by the at least one processor, configure the kiosk to:

present instructions to a user of the kiosk via the display screen, including an instruction to the user to insert a government-issued identification document into the identification scanner;

obtain a digital form of the user's identification from the user's government-issued identification document using the identification scanner;

transmit, via the communications network, the digital form of the user's identification to a remote computing device;

receive, via the communications network, from the remote computing device verification data for the user; and based at least in part on the received verification data, verify the identity of the user and acceptability of the user for gaming;

on verification of the user's identity and acceptability for gaming, display on the display screen an indication that the user is approved for gaming activities.

2. The kiosk of claim 1, wherein the kiosk housing further includes:

a biological sensor configured to obtain biological data from the user and store the biological data in digital form; and the instructions, when executed by the at least one processor further configuring the kiosk to:

obtain biological data of the user using the biological sensor and store the biological data in digital form;

compare the digital form of the biological data to the digital form of the user's identification; and verify the identity of the user and the user's acceptability for gaming based at least in part on the comparison of the digital form of the biological data and the digital form of the user's identification.

3. The kiosk of claim 2, wherein:

the biological sensor is a camera and the biological data is a digital image of a face of the user captured by the camera.

4. The kiosk of claim 2, wherein when comparing the digital form of the biological data to the digital form of the user's identification and verifying the identity of the user and the user's acceptability for gaming based at least in part on the comparison of the digital form of the biological data and the digital form of the user's identification, the instructions, when executed by the at least one processor, further configure the kiosk to:

transmit, via the communications network, the digital form of the biological data to the remote computing device;

receive, via the communications network, from the remote computing device verification data for the user based on a comparison of the digital form of the user's identification and the digital form of the biological data; and based at least in part on the received verification data, verify the identity of the user and acceptability of the user for gaming.

5. The kiosk of claim 1, wherein the remote computing device is an off-site verification office.

6. The kiosk of claim 1, wherein the housing further includes:

a currency acceptor and dispenser designed to accept currency and dispense currency for gaming;

the instructions, when executed by the at least one processor, configuring the kiosk to:

accept currency at the currency acceptor for deposit into a wagering account; and pay out gaming winnings at the currency dispenser.

7. The kiosk of claim 2, wherein:

the biological sensor is a signature pad and the biological data is a digital representation of the user's signature.

8. The kiosk of claim 2, wherein the instructions, when executed by the at least one processor, configure the kiosk to:

verify the identity of the user based at least in part on information regarding a financial account of the user.

9. The kiosk of claim 2, the kiosk housing further including:

a credit card acceptor configured to obtain a digital form of the user's signature from a user credit card;

wherein the instructions, when executed by the at least one processor, configure the kiosk to:

present instructions to a user of the kiosk via the display screen, including an instruction to the user to insert a credit card into the credit card acceptor;

obtain a digital form of the user's signature from the user's credit card using the credit card acceptor;

verify the identity of the user and the user's acceptability for gaming based at least in part on the digital form of the user's signature.

10. The kiosk of claim 9, wherein when verifying the identity of the user and the user's acceptability for gaming based at least in part on the digital form of the user's signature, the instructions, when executed by the at least one processor, further configure to kiosk to:

transmit, via the communications network, the digital form of the user's signature to the remote computing device;

receive, via the communications network, from the remote computing device verification data for the user based on the digital form of the user's signature; and based at least in part on the received verification data, verify the identity of the user and acceptability of the user for gaming.

11. The kiosk of claim 1, wherein:

the government-issued identification document is a government-issued drivers license or identification card.

12. The kiosk of claim 1, wherein the instructions, when executed by the at least one processor, further configure the kiosk to provide gaming activities to the user.

13. A method, comprising:

presenting, by at least one processor, instructions to a user of a kiosk via a display screen of the kiosk, the instructions including an instruction to the user to insert a government-issued identification document into an identification scanner of the kiosk;

obtaining, by at least one processor, a digital form of the user's identification from the user's government-issued identification document using the identification scanner;

transmitting, via a communications network, the digital form of the user's identification to a remote computing device;

receiving, via the communications network, from the remote computing device verification data for the user; and based at least in part on the received verification data, verifying the identity of the user and acceptability of the user for gaming;

on verification of the user's identity and acceptability for gaming, displaying on the display screen an indication that the user is approved for gaming activities.

14. The method of claim 13, further comprising:

obtaining biological data of the user using a biological sensor of the kiosk and store the biological data in digital form;

comparing the digital form of the biological data to the digital form of the user's identification; and verifying the identity of the user and the user's acceptability for gaming based at least in part on the comparison of the digital form of the biological data and the digital form of the user's identification.

15. The method of claim 14, wherein:

the biological sensor is a camera and the biological data is a digital image of a face of the user captured by the camera.

16. The method of claim 14, wherein when comparing the digital form of the biological data to the digital form of the user's identification and verifying the identity of the user and the user's acceptability for gaming based at least in part on the comparison of the digital form of the biological data and the digital form of the user's identification, the method further comprises:

transmitting, via the communications network, the digital form of the biological data to the remote computing device;

receiving, via the communications network, from the remote computing device verification data for the user based on a comparison of the digital form of the user's identification and the digital form of the biological data; and based at least in part on the received verification data, verifying the identity of the user and acceptability of the user for gaming.

17. The method of claim 13, wherein the remote computing device is an off-site verification office.

18. The method of claim 13, further comprising:

accepting currency at a currency acceptor of the kiosk for deposit into a wagering account; and paying out gaming winnings at a currency dispenser of the kiosk.

19. The method of claim 14, wherein:

the biological sensor is a signature pad and the biological data is a digital representation of the user's signature.

20. The method of claim 14, further comprising verifying the identity of the user based at least in part on information regarding a financial account of the user.

21. The method of claim 14, further comprising:

presenting instructions to a user of the kiosk via the display screen, including an instruction to the user to insert a credit card into a credit card acceptor of the kiosk, the credit card acceptor configured to obtain a digital form of the user's signature from a user credit card;

obtaining a digital form of the user's signature from the user's credit card using the credit card acceptor;

verifying the identity of the user and the user's acceptability for gaming based at least in part on the digital form of the user's signature.

22. The method of claim 21, wherein when verifying the identity of the user and the user's acceptability for gaming based at least in part on the digital form of the user's signature, the instructions, when executed by the at least one processor, the method further comprises:

transmitting, via the communications network, the digital form of the user's signature to the remote computing device;

receiving, via the communications network, from the remote computing device verification data for the user based on the digital form of the user's signature; and based at least in part on the received verification data, verifying the identity of the user and acceptability of the user for gaming.

23. The method of claim 13, wherein:

the government-issued identification document is a government-issued drivers license or identification card.

24. The method of claim 13, further comprising providing gaming activities to the user on the kiosk.

* * * * *